(12) United States Patent
Suh et al.

(10) Patent No.: US 11,635,885 B2
(45) Date of Patent: Apr. 25, 2023

(54) ELECTRONIC DEVICE FOR SUPPORTING AUTOMATION SERVICES

(71) Applicant: Samsung Electronics Co., Ltd., Gyeonggi-do (KR)

(72) Inventors: Donghee Suh, Gyeonggi-do (KR); Jungkeun Cho, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/536,357

(22) Filed: Nov. 29, 2021

(65) Prior Publication Data

US 2022/0171525 A1 Jun. 2, 2022

Related U.S. Application Data

(63) Continuation of application No. PCT/KR2021/015378, filed on Oct. 29, 2021.

(30) Foreign Application Priority Data

Dec. 2, 2020 (KR) .......................... 10-2020-0166399

(51) Int. Cl.
*G06F 3/04847* (2022.01)
*G06F 9/451* (2018.01)
(Continued)

(52) U.S. Cl.
CPC ........ *G06F 3/04847* (2013.01); *G06F 3/0482* (2013.01); *G06F 3/0488* (2013.01); *G06F 9/453* (2018.02)

(58) Field of Classification Search
CPC .. G06F 3/0482; G06F 3/04847; G06F 3/0488; G06F 9/453
See application file for complete search history.

(56) References Cited

U.S. PATENT DOCUMENTS 9,699,161 B2  7/2017  Ducker et al.
10,068,028 B1  9/2018  Hendriks
(Continued)

FOREIGN PATENT DOCUMENTS

KR  10-2007-0024737 A  3/2007
KR  10-2011-0086156 A  7/2011
(Continued)

OTHER PUBLICATIONS

International Search Report dated Jan. 27, 2022.
Written Opinion dated Jan. 27, 2022.

*Primary Examiner* — Seth A Silverman
(74) *Attorney, Agent, or Firm* — Cha & Reiter, LLC

(57) ABSTRACT

In certain embodiments, an electronic device may include: a touch-sensitive display; a processor operatively connected to the display; and a memory operatively connected to the processor, wherein the memory stores instructions which, when executed, cause the processor to: provide, through the display, a registration screen for registering an automation in the electronic device, the automation being defined as at least one action automatically executed when a designated trigger occurs; register an action in the electronic device as a feature of the automation through the registration screen, the action being selected by a user; and when the action registered as the feature of the automation corresponds to a data reference action configured to refer to data, display guidance information for a data processing action, the data processing action being configured to output a result value by using, as a first input value, an output value output as a result of executing the data reference action. Various other embodiments are possible.

11 Claims, 9 Drawing Sheets

(51) Int. Cl.
  *G06F 3/0488* (2022.01)
  *G06F 3/0482* (2013.01)

(56) References Cited

U.S. PATENT DOCUMENTS

| | | |
|---|---|---|
| 10,838,779 B1 | 11/2020 | Yue et al. |
| 11,048,474 B2 | 6/2021 | Bae et al. |
| 2002/0095572 A1* | 7/2002 | Frank .................... G06F 21/629 |
| | | 713/166 |
| 2002/0095592 A1* | 7/2002 | Daniell ................ G06F 21/604 |
| | | 726/26 |
| 2006/0005156 A1 | 1/2006 | Korpipaa et al. |
| 2008/0034322 A1* | 2/2008 | Kujirai ................ G06F 3/04845 |
| | | 715/808 |
| 2010/0122194 A1 | 5/2010 | Rogers |
| 2012/0309363 A1 | 12/2012 | Gruber et al. |
| 2012/0311585 A1 | 12/2012 | Gruber et al. |
| 2017/0054812 A1 | 2/2017 | Hurley et al. |
| 2019/0069149 A1 | 2/2019 | Park et al. |
| 2019/0196705 A1 | 6/2019 | Tu |
| 2019/0235478 A1* | 8/2019 | Nakamoto ....... G05B 19/41865 |
| 2019/0265946 A1* | 8/2019 | Bae .................... H04M 1/72454 |
| 2019/0306247 A1 | 10/2019 | Park et al. |

FOREIGN PATENT DOCUMENTS

| | | |
|---|---|---|
| KR | 10-2017-0125403 A | 11/2017 |
| KR | 10-2018-0062745 A | 6/2018 |
| KR | 10-2019-0021767 A | 3/2019 |
| KR | 10-2020-0039824 A | 4/2020 |
| KR | 10-2020-00067798 A | 6/2020 |

* cited by examiner

FIG. 3

```
      {
310 ─── "id": "com.samsung.android.calendar.actions.FindEvents",
320 ─── "category": "action.category.MOBILE.APPS",
        "intent": "intent.type.GET_STATUS.NONE",
330 ─── "displayName": "@string/find_events_calendar_action_label",
        "recoveryOption": "oneOff",
        "permissions": [],
340 ─── "fulfillment": {
          "urlTemplate": "content://com.samsung.android.app.bixby.automation.adaptation/actions/deeplink
        },
350 ─── "parameters":[
          {
            "id": "keyword",
            "displayName": "@string/calendar_parameter_search_term",
            "description": "@string/calendar_parameter_search_term",
            "type": "datatype.primirive.AFString",
            "configUri": "routine://configure/string"
          }
        ],
        "combinations": [
          {
            "placements": [
              {
                "paramName": "keyword"
              }
            ]
          {
        ],
360 ─── "output" : {
          "dataReferenceAction" : true
          "type" : "datatype.composite.AFCalendar"
        }
      }
```

ELECTRONIC DEVICE FOR SUPPORTING AUTOMATION SERVICES

CROSS-REFERENCE TO RELATED APPLICATION

This application is a Continuation of International Application No. PCT/KR2021/015378, filed on Oct. 29, 2021 which is based on and claims priority under 35 U.S.C. § 119 to Korean Patent Application No. 10-2020-0166399, filed on Dec. 2, 2020, in the Korean Intellectual Property Office, the disclosure of which is incorporated by reference herein in its entirety.

TECHNICAL FIELD

Certain embodiments of the disclosure relate to an electronic device configured to recognize a state of or a situation around the electronic device and automatically perform a function or a service according to the recognized state or situation.

BACKGROUND ART

An electronic device may provide a user with an application. The application can enable the user to register a condition for causing a function or a service supported to be automatically executed. Here, the condition may be defined as a trigger. An operation (e.g., function or service) automatically executed when state of or situation around the electronic device satisfies the registered condition may be referred to as an action. A combination of a trigger and at least one action may be referred to as an automation and the automation may be registered in the electronic device.

As one example, when it is recognized (triggered) that a remaining capacity of a battery (the state of the electronic device) is reduced to approximately 20% or lower, a power saving mode function (action) (turning off Bluetooth, and turning on a dark mode), may be automatically executed. As another example, when the location of (the situation around) the electronic device corresponds to a designated place (e.g., home) (the trigger), at least one action defined in the corresponding automation may be executed. The at least one action can include, for example, turning on Wi-Fi, turning on an air conditioner, and setting the temperature of an air conditioner to 25 C (77 F).

SUMMARY

Actions may be classified with reference to whether a user can identify an execution result of each of the actions. For example, an action, such as an operation of retrieving a schedule from a calendar refers to designated data. It is difficult for a user to determine the execution result of an action that refers to designated data (now referred to as a data reference action).

Another class of actions is a data processing action. A data processing action is configured to process referenced data. For example, showing the retrieved schedule through a pop-up window or deleting the retrieved schedule from Calendar, may be classified as a data processing action. The user can identify the execution result of a data processing action.

A data processing action as a follow-up action of the data reference action may not be defined in the corresponding automation. Accordingly, it may be difficult to identify the execution result of the automation.

A chainable relationship may be established between actions. For example, a preceding-subsequent relationship in which a first action precedes and then a second action is executed may be established.

When a type of an output value obtained as a result of execution of the first action is different from the type of an input value required to execute the second action, the chainable relationship between the first action and the second actions may have failed to be established. Accordingly, even though two actions may have a substantial chainable relationship, the two actions are independent to each other and two actions may be individually executed.

Accordingly, when the first action and the second action are grouped into the same automation, and even where the type of the output value of the first action is different from the type of the input value of the second action, the second action may not be executed.

Certain embodiments of the disclosure may provide an electronic device configured to provide a user with guidance on a need for registration of a data processing action while an automation is generated.

Certain embodiments of the disclosure may provide an electronic device configured to recommend a list of candidates, each of which can be registered as a follow-up action to be executed after a registered action, to a user. For example, the electronic device may recommend a candidate list of a data processing action which can use an output value of a data reference action as an input value, to the user.

Certain embodiments of the disclosure may provide an electronic device configured to perform type conversion when the type of an input value of a selected candidate as a follow-up action is different from the type of an output of the preceding action. Accordingly, actions registered in the automation may be normally performed.

The technical problems to be solved by the disclosure are not limited to the mentioned technical problems above, and other technical problems that are not mentioned may be clearly understood by those skilled in the art to which the disclosure belongs, from the description below.

An electronic device according to certain embodiments may include: a touch-sensitive display; a processor operatively connected to the display; and a memory operatively connected to the processor, wherein the memory stores instructions which, when executed, cause the processor to provide, through the display, a registration screen for registering an automation in the electronic device, the automation being defined as at least one action automatically executed when a designated trigger occurs; register an action in the electronic device as a feature of the automation through the registration screen, the action being selected by a user; and when the action registered as the feature of the automation corresponds to a data reference action configured to refer to data, display guidance information for a data processing action, the data processing action being configured to output a result value by using, as a first input value, an output value output as a result of executing the data reference action.

A method for operating an electronic device according to certain embodiments may include: providing, through a display, a registration screen for registering an automation in the electronic device, the automation being defined as at least one action automatically executed when a designated trigger occurs; registering an action in the electronic device as a feature of the automation through the registration screen, the action being selected by a user; and when the action registered as the feature of the automation corresponds to a data reference action configured to refer to data, displaying guidance information for a data processing action, the data processing action being configured to output a result value by using, as a first input value, an output value output as a result of executing the data reference action.

According to certain embodiments, an electronic device can provide a user with a result of a registered automation. In addition, various effects directly or indirectly identified through the disclosure can be provided.

BRIEF DESCRIPTION OF DRAWINGS

FIG. 3 is an example showing a specification of a feature to be configured for an automation;

DETAILED DESCRIPTION

Figure 1:
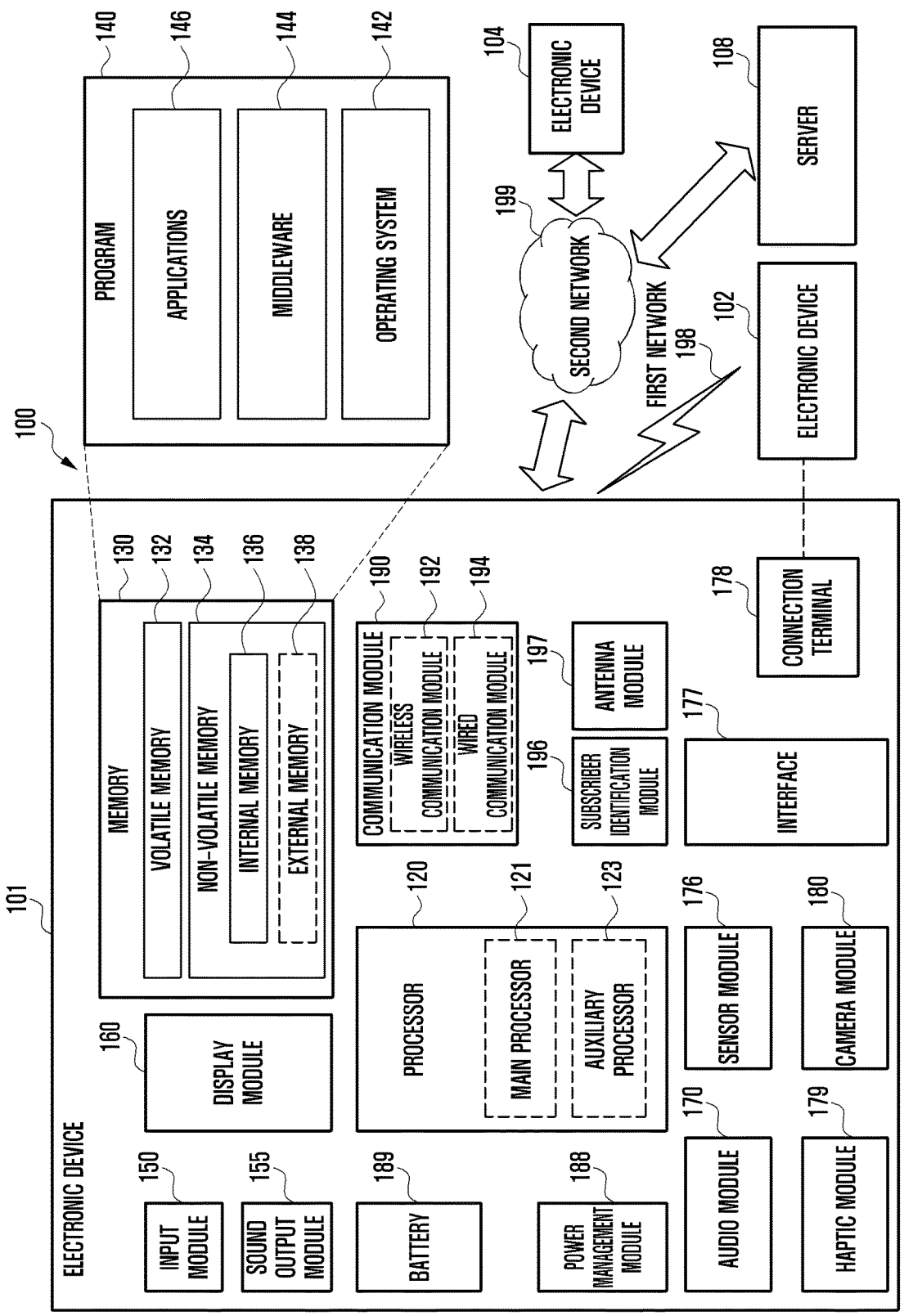
FIG. 1 is a block diagram of an electronic device in a network environment according to certain embodiments.

FIG. 1 is a block diagram illustrating an electronic device 101 in a network environment 100 according to certain embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. The term "processor" as used in this document shall refer to both the singular and plural contexts. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thererto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to certain embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to certain embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that certain embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with certain embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Certain embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to certain embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments, each component (e.g., a module or a program) of the above-described components may include a single entity or multiple entities, and some of the multiple entities may be separately disposed in different components. According to certain embodiments, one or more of the above-described components may be omitted, or one or more other components may be added. Alternatively or additionally, a plurality of components (e.g., modules or programs) may be integrated into a single component. In such a case, according to certain embodiments, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

Figure 2:
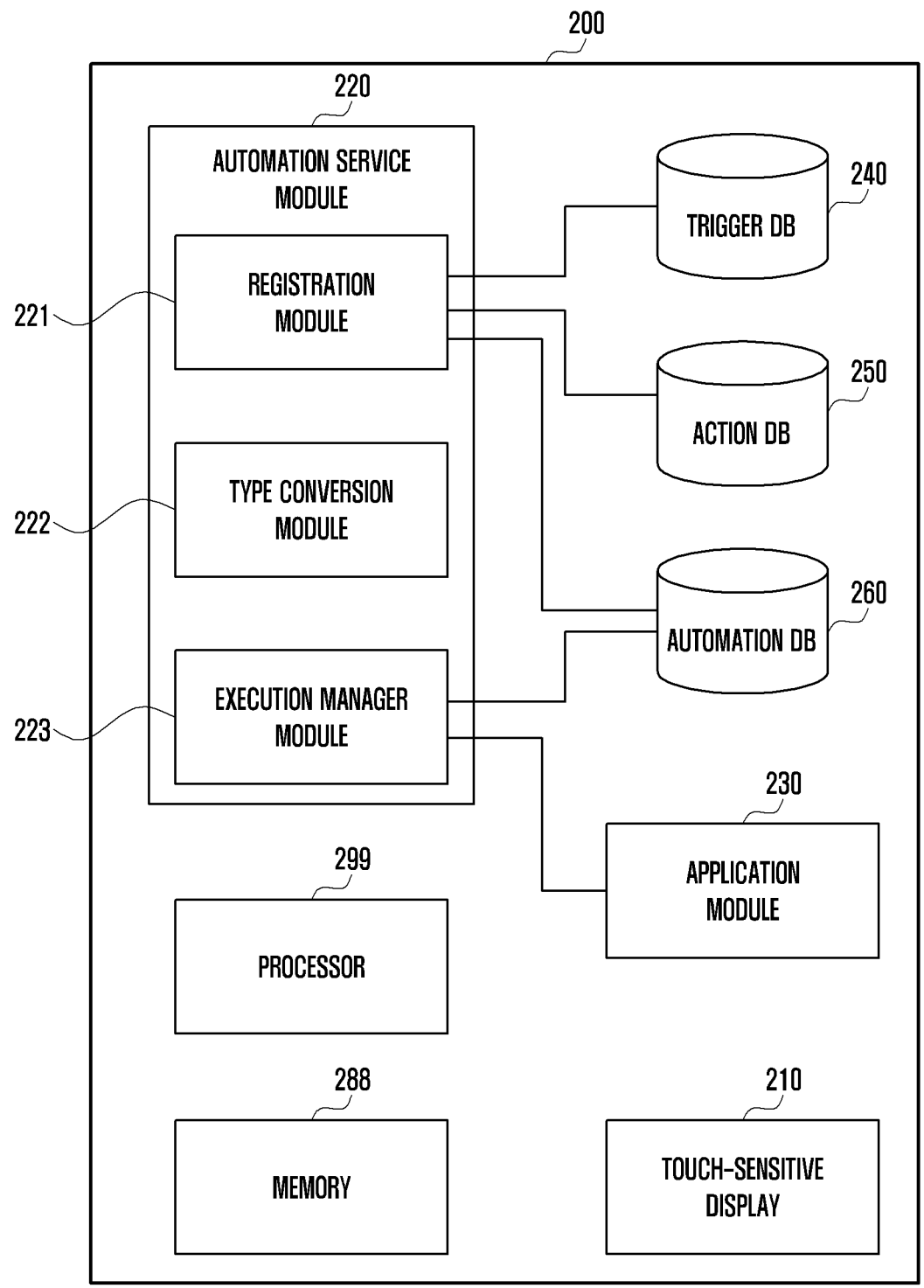
FIG. 2 is a block diagram of an electronic device configured to register and automatically execute an automation according to certain embodiments.

FIG. 2 is a block diagram of an electronic device 200 configured to register and automatically execute an automation according to certain embodiments. FIG. 3 is an example showing a specification of a feature to be configured for the automation. Referring to FIG. 2, the electronic device 200 (e.g., the electronic device 101 of FIG. 1) may include a touch-sensitive display 210 (e.g., the display module 160 of FIG. 1), an automation service module 220, an application module 230, a trigger DB 240, an action DB 250, an automation DB 260, a memory 288, or a processor 299. The components of the electronic device 200 may be operatively or electrically connected to each other.

The automation service module 220 may include a registration module (or a generation module) 221 configured to register an automation in the electronic device 200, a type conversion module 222 configured to convert a type of a feature configured for the automation, and an execution manager module 223 configured to manage execution of the automation.

The registration module 221 may provide a user with a registration screen enabling the user to register an automation in the electronic device 200, through the display 210. The registration module 221 may configure an automation including a trigger and at least one action by communicating with the user through the registration screen and register the automation in the automation DB 260.

In an embodiment, the registration module 221 may identify the trigger from the trigger DB 240. For example, the registration module 221 may identify a trigger corresponding to a keyword input through a trigger registration screen, from the trigger DB 240. The trigger DB 240 may store specifications of triggers configurable as features of the automation. The registration module 221 may configure a trigger list by using the specifications of the triggers identified from the trigger DB 240, and provide the trigger list for the user through the trigger registration screen. The registration module 221 may determine an automation feature (e.g., an operation of turning on Wi-Fi) selected by a user from the trigger list, as a trigger of the automation, to be registered in the automation DB 260. Here, the registering of the trigger in the automation DB 260 may include storing the selected feature in the automation DB 260 as a trigger of the corresponding automation.

In an embodiment, the registration module 221 may identify an action from the action DB 250. For example, the registration module 221 may identify an action corresponding to a keyword input through an action registration screen, from the action DB 250. The action DB 250 may store specifications of actions configurable as features of the automation. The registration module 221 may configure an action list by using the specifications of the actions identified from the action DB 250, and provide the user with the action list through the action registration screen. The registration module 221 may determine an automation feature (e.g., an operation of turning on Bluetooth) selected by the user from the action list, as an action of the automation, to be registered in the automation DB 260. The registering of the action in the automation DB 260 may include storing the selected feature in the automation DB 260 as an action of the corresponding automation.

In the embodiment above, a DB for managing specifications of automation features is divided into the trigger DB 240 and the action DB 250, but is not limited thereto, and the automation features may be managed in a single DB without division.

The automation features which can be included in the trigger list and the action list are as shown in Table 1 below.

TABLE 1

| Trigger | Action |
|---|---|
| Related to system function | Related to system function |
| When Wi-Fi is turned on/off | Turn on/off Wi-Fi |
| When Bluetooth is turned on/off | Connect to specific Wi-Fi |
| When remaining capacity of battery is 50% or lower | Bluetooth |
| When sound mode is changed to vibration mode | |
| Related to application operation | Related to application operation |
| When call from OO is received | Send quick refusal message |
| When message from OO is received | Retrieve schedule |
| When alarm XX is turned off | Share schedule |
| When photograph is taken | Delete schedule |
| | Retrieve contact |
| | Share contact |
| | Send message of XX to OO |
| | Take photograph |
| | Share taken photograph |
| Related to external device operation | Related to external device operation |
| When temperate of air conditioner corresponds to 28 degrees Celsius | Configure temperature of air conditioner at 28 degrees Celsius |
| When TV volume corresponds to level 25 or higher | Start spin-drying mode of washing machine |

TABLE 1-continued

| Trigger | Action |
|---|---|
| When washing machine has completed rinsing | |
| Related to place | Related to service operation |
| When coming within 150 m radius of Seoul station | Order menu item OO at coffee shop OO |
| When going beyond 150 m radius of Gangnam station | Retrieve weather information |
| Related to time | Related to built-in operation |
| At 7 pm every day | Read text |
| Between 6 am and 7 am on Mondays | View in pop-up window |

The registration module 221 may define specifications of a trigger and an action to be configured in an automation, store the defined specification of the trigger in the trigger DB 240, and store the defined specification of the action in the action DB 250. The registration module 221 may register the automation in the automation DB 260 with reference to the specifications. For example, a specification of an automation feature called "retrieve schedule OO" may be defined as shown in FIG. 3.

Referring to FIG. 3, the specification may include an identifier 310 indicating the corresponding automation feature, a category 320 of the corresponding feature, information 330 indicating a scheme of showing the corresponding feature to the user, information 340 indicating a scheme of processing the corresponding feature (e.g., if the corresponding feature is an "operation of sending a message", an instruction for controlling a message application is included), an input value 350 corresponding to a parameter required to execute the corresponding feature, or an output value 360 corresponding to a result shown upon the execution of the corresponding feature.

A type among sub fields of the input value 350 and the output value 360 may mean a type of data dealt with by the corresponding feature. For example, referring to Table 2 below, in an action called "retrieve schedule OO", the input value may include a keyword called "OO", and the type of the keyword (input value) may be defined as a string. The output value may include a schedule (e.g., a schedule ID, a date, a schedule title, time, a place, and a participant) found by searching using the keyword "OO". A data class of the output value of the action may include properties of each specification, and the type of the output value may be defined as CalendarEvent.

TABLE 2

| | Input value | Output value |
|---|---|---|
| Data | Keyword | Schedule ID, schedule name, date, start time, schedule end time, place, summary, participant |
| Type | String | CalendarEvent |
| Data class | public class AFString implements AFData, Equatable<AFString>, Comparable<AFString>, StringFul{ private String string; public AFString( ) { } | public class AFCalendarEvent implements AFData, LocationFul, ContactListFul, StringFul, GeoLocationFul, DisplayNameFul { private AFString id; private AFString eventName; private AFDateTime startDate; private AFDateTime endDate; private AFLocation location; private AFURL url; private AFList<AFContact> attendanceList = new AFList( ); private AFString summary = AFString off(""); private AFString displayName; |

TABLE 2-continued

| Input value | Output value |
|---|---|
| | public AFCalendarEvent( ) { } |

Actions to be registered in the automation DB 260 may be classified into a data reference action (e.g., an operation of identifying a schedule on DD/MM/YY from Calendar) and a data processing action (e.g., an operation of deleting a retrieved schedule or providing the user with the retrieved schedule through a pop-up window) with reference to whether a scheme of identifying the output value is provided for the user.

In certain embodiments, a data reference action can be an action referring to designated data. In certain embodiments, a data reference action can be an action that refers to recorded user data (including another person at another terminal) that is saved and made available in substantially the same form that it was input. Examples may include, but are not limited to an appointment in a calendar, a contact, the content of an email, or content of a text message, a photograph viewing function, such as Gallery™. In certain embodiments, a data reference action can be an action that refers to user input textual data that is input by a user (including another user at another terminal) in textual form, and made available as text for the user to see on the touch-sensitive display 210, where the text made available to see is substantially the same user input textual data as was entered.

The data processing action for processing the output value of the data reference action may be registered as a follow-up action on the data reference action. For example, the output value (e.g., schedule) of a preceding action (data reference action) may be used as an input value of the follow-up action (data processing action). The user may identify whether the preceding action has been correctly performed, through the result of the processing of the follow-up action. For example, when the follow-up action (data processing action) corresponds to an "operation of deleting a schedule", the user may identify whether a result value (e.g., retrieved schedule) of the preceding action is a desired result value, through the result of the performance (deletion of a schedule) of the data processing action.

The result of the data processing action is identifiable from itself, and may thus include a value (e.g., none) indicating that the type of the output value is not designated or a value (e.g., Boolean) indicating whether the execution has been successfully completed. Accordingly, data processing actions may be performed independently rather than being dependent on each other.

In an embodiment, the type of the output value may be defined for each action as shown in Table 3 below.

TABLE 3

| Data reference action | | Data processing action | |
|---|---|---|---|
| Action | Output value type | Action | Output value type |
| Retrieve schedule | CalendarEvent id eventName startDate endDate location attendee | Delete schedule Share schedule Amend schedule Move schedule (e.g., Move to detail screen) | None or Boolean |

TABLE 3-continued

| | Data reference action | | Data processing action | |
|---|---|---|---|---|
| Action | Output value type | Action | Output value type |
| Retrieve contact | Contact id contactName phoneNumber emailAddress | Call Send message Reject phone call | None or Boolean |
| Retrieve message | Message id sender text | Read message Reply | None or Boolean |
| Retrieve file | File id fileName filePath fileType | Delete Share Open | None or Boolean |

In an embodiment, the registration module 221 may identify whether an action registered in the automation DB 260 corresponds to a data reference action, and may provide guidance on a need for a data processing action as a follow-up action, for the user through the registration screen when a follow-up action associated with the data reference action is not registered. In response to a user input on the guidance, the registration module 221 may provide an available candidate list as the follow-up action through the registration screen.

When the output value type of the preceding action does not correspond to the input value type of the follow-up action, the follow-up action may not be performed due to non-establishment of a chainable relationship between two actions even though the follow-up action is registered by the user through the candidate list above.

When an output value type of a first action registered as a preceding action is different from an input value type of a second action registered as a follow-up action, the type conversion module 222 may convert the output value type of the first action according to the input value type of the second action. For example, when the first action corresponds to "retrieve schedule OO", the output value type of the first action may be a type of data, classified into a schedule ID, a schedule name, a start time, an end time, a place, and a participant, as shown in Table 3. The input value type of the second action corresponds to a string, the type conversion module 222 may perform an operation of converting the output value type of the first action into string.

The execution manager module 223 may execute an automation registered in the automation DB 260, in association with the application module 230 by using the specification of the feature in Table 2 above.

In an embodiment, the execution manager module 223 may be recognized that a trigger has occurred. For example, the execution manager module 223 may recognize that a designated operation has been executed as a trigger by the application module 230. For example, the trigger may include an operation of receiving a message (e.g., a chat (or instant) message, a social networking service (SNS) message, and a call (e.g., voice call or video call) request message) of a designated contact from an external electronic device through a wireless communication circuit by a message application, an operation of providing, by a notification application, a notification corresponding to a designated event (e.g., an operation of receiving a message from a message application) generated in other applications, through a display and/or a speaker, an operation of taking a photograph by using a camera by a camera application, an operation of recognizing, by a health application, an arrival of the electronic device 200 in a designated place (e.g., home), through a position recognition module (e.g., a global navigation satellite system (GNSS)), or an operation of recognizing, by a device management application, reduction in a remaining capacity of a battery to a designated value or lower. Various other operations can be designated a trigger.

In an embodiment, the execution manager module 223 may identify an action designated as an operation which is to be performed when the trigger is generated, from the automation DB 260, and control the application module 230 to execute the identified action (e.g., a function or a service).

When the electronic device 200 is manufactured, the application module 230 (e.g., the application 146 of FIG. 1) may be implemented as an embedded application and/or as an application distributed online (e.g., an application store) or in the form of a storage medium. The application module 230 may transmit information indicating a designated operation executed as a trigger, to the automation service module 220, and execute the function or the service by using action information received from the automation service module 220 as a response to the transmission of the information.

The registration module 221, the type conversion module 222, the execution manager module 223, or the application module 230 may be stored as instructions in the memory 288 (e.g., the memory 130 of FIG. 1), and may be executed by the processor 299 (e.g., the processor 120 of FIG. 1). At least one of the modules 221, 222, 223, and 230 may be executed by a processor (e.g., the auxiliary processor 123) specified to process an artificial intelligence model. The trigger DB 240, the action DB 250, or the automation DB 260 may be stored in the memory 288 or in a chip that is physically separated from the memory 288.

Certain embodiments may include additional components other than the components illustrated in FIG. 2, or at least one of the components illustrated in FIG. 2 may be omitted. For example, the electronic device 200 may further include a microphone (e.g., the input module 150 of FIG. 1) for receiving a designated user input for invoking the automation service module 220.

Figure 4:
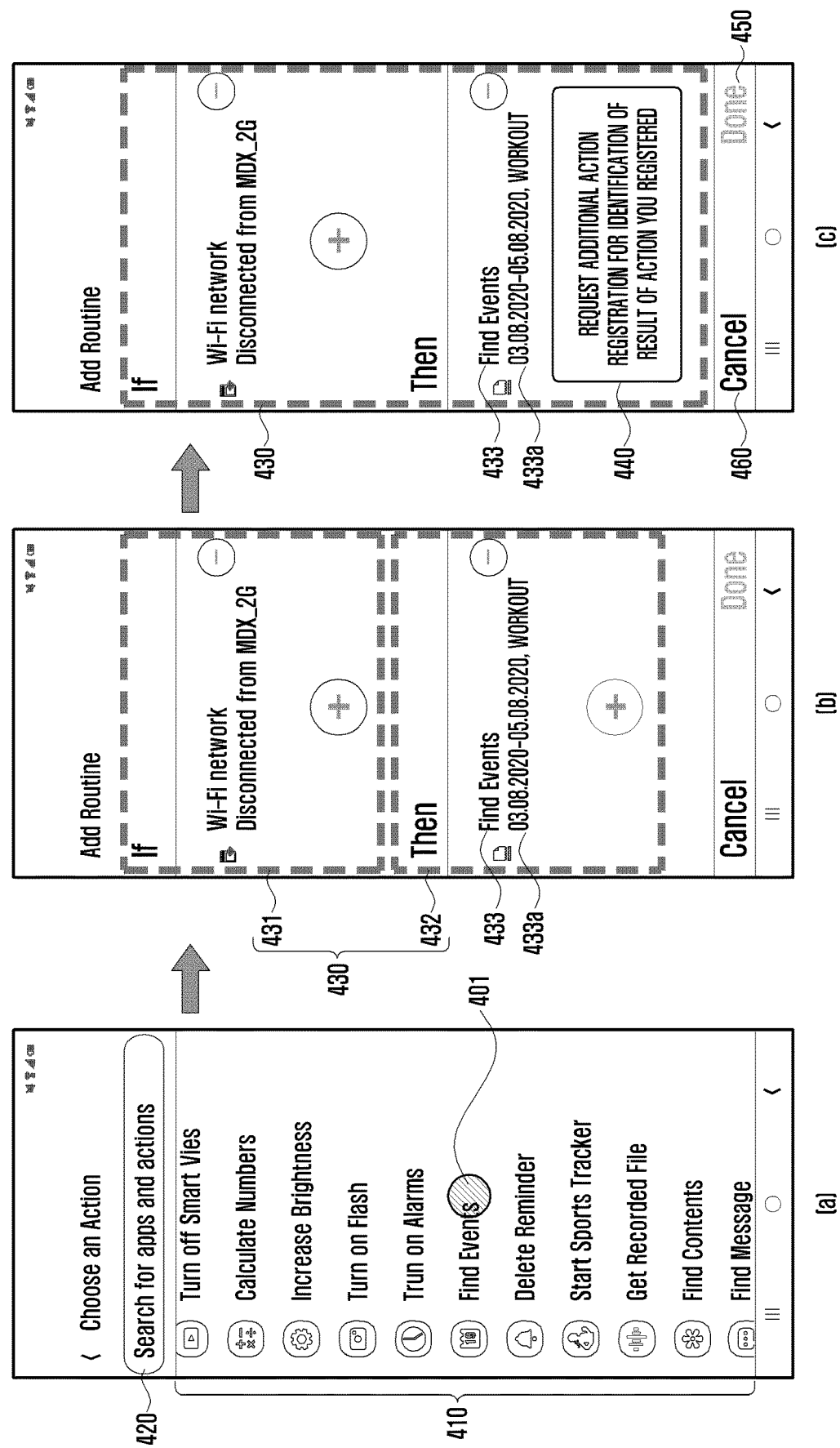
FIG. 4 illustrates an operation of providing a user with guidance on a need for registration of a follow-up action according to an embodiment.

FIG. 4 illustrates an operation of providing a user with guidance on a need for registration of a follow-up action according to an embodiment. In FIG. 4A, a first screen is displayed including a non-exclusive action list 410, and a box for searching actions by search word. Where the user selects an action, e.g., "Find Events" by making a touch input 401, the screen of FIG. 4B is displayed. The screen of FIG. 4B includes a first section 431 and a second section 432. The first section 431 can display or receive a condition or trigger for the action, e.g., "Wi-Fi network disconnected from MDX_2G." Second section 432 displays and receives input for a first action item 433. The actions in the second section 433 are performed in response to the condition or trigger of the first section 431. Where the first action item is a data reference action, a popup screen 440 is displayed to assist the user in requesting additional action.

Referring to FIG. 4A, a processor (e.g., the processor 299 of FIG. 2) may provide the user with an action list 410 through a display (e.g., the display module 160 of FIG. 1 or the touch-sensitive display 210 of FIG. 2). The processor 299 may select actions from the action DB 250 according to a configured condition. For example, the processor 299 may randomly select actions from the action DB 250. Alternatively, the processor 299 may select actions each having a name corresponding to a keyword input from the user through a search window 420, from the action DB 250.

Alternatively, the processor 299 may select actions corresponding to favorite applications recently used (e.g., within a week), from the action DB 250. Alternatively, the processor 299 may select actions, wherein the usage frequency of each of the actions is greater than the number of designated times for each unit time, from the action DB 250. Actions may be selected according to various other conditions. The processor 299 may include actions items (e.g., each item includes an icon indicating an application performing the corresponding action and a name of the corresponding action) indicating the selected actions in the action list 410 and display the same. Due to the size of the display or the size of the icon, all action items may not be displayed through the action list 410. While some of the action items are displayed through the action list 410, the processor 299 may display other action items through the action list 410 in response to a touch gesture (e.g., an up or down dragging gesture) of the user.

Referring to FIG. 4B, the processor 299 may provide the user with a screen 430 for automation registration, through the display. For example, in response to a selection (e.g., a touch 401 on the corresponding item) of a designated action item from an action list (e.g., the action list 410 of FIG. 4A) by the user, the processor 299 may perform screen switching from the action list 410 to the registration screen 430. The processor 299 may include a first section 431 for trigger registration and a second section 432 for action registration in the registration screen 430 and display the same on the display. The processor 299 may register an action of an item selected from the action list 410 as a first action of an automation, and provide a first action item 433 indicating the first action, through the second section 432. The processor 299 may receive an input value required to perform the first action from the user through the second section 432. For example, in response to a touch input of the user on the first action item 433, the processor 299 may display an execution screen (e.g., calendar screen) of an application configured to execute the first action (e.g., searching for event OO), on the display. The processor 299 may receive an input value (e.g., 03.08.2020-05.08.2020 Workout) from the user through the execution screen, and configure the received input value as the input value of the first action. Additionally, the processor 299 may display an input value 433a in the position adjacent to the first action item 433.

The processor 299 may identify a specification of the first action to determine whether the first action corresponds to a data reference action. For example, referring to FIG. 3, the processor 299 may identify a value of "dataReferenceAction" among sub fields of the output value 360, recognize the first action as the data reference action if the value thereof corresponds to "true", and recognize the first action as a data processing action if the value thereof corresponds to "false".

Referring to FIG. 4C, if the first action is recognized as the data reference action, the processor 299 may provide the user with guidance on a need for registration of a follow-up action, through a pop-up window 440. The processor 299 may terminate the display of the pop-up window 440 after expiration of a designated time from a time point at which the display starts or in response to a touch input of the user (e.g., a touch gesture of moving the pop-up window out of the screen). Even though a user input (e.g., a touch input on a completion button 450) for completing automation registration without registration of a follow-up action, the processor 299 may maintain the display of the registration screen 430 without responding to the user input. Additionally, or instead of displaying the pop-up window 440, the processor 299 may provide the user with guidance on that the automation registration has failed to be completed by displaying the completion button 450 to cause the same to be displayed distinguishably (e.g., blurry) from other user interface (UI) features (e.g., a cancellation button 460, the first action item 433, and the input value 433a).

Figure 5:
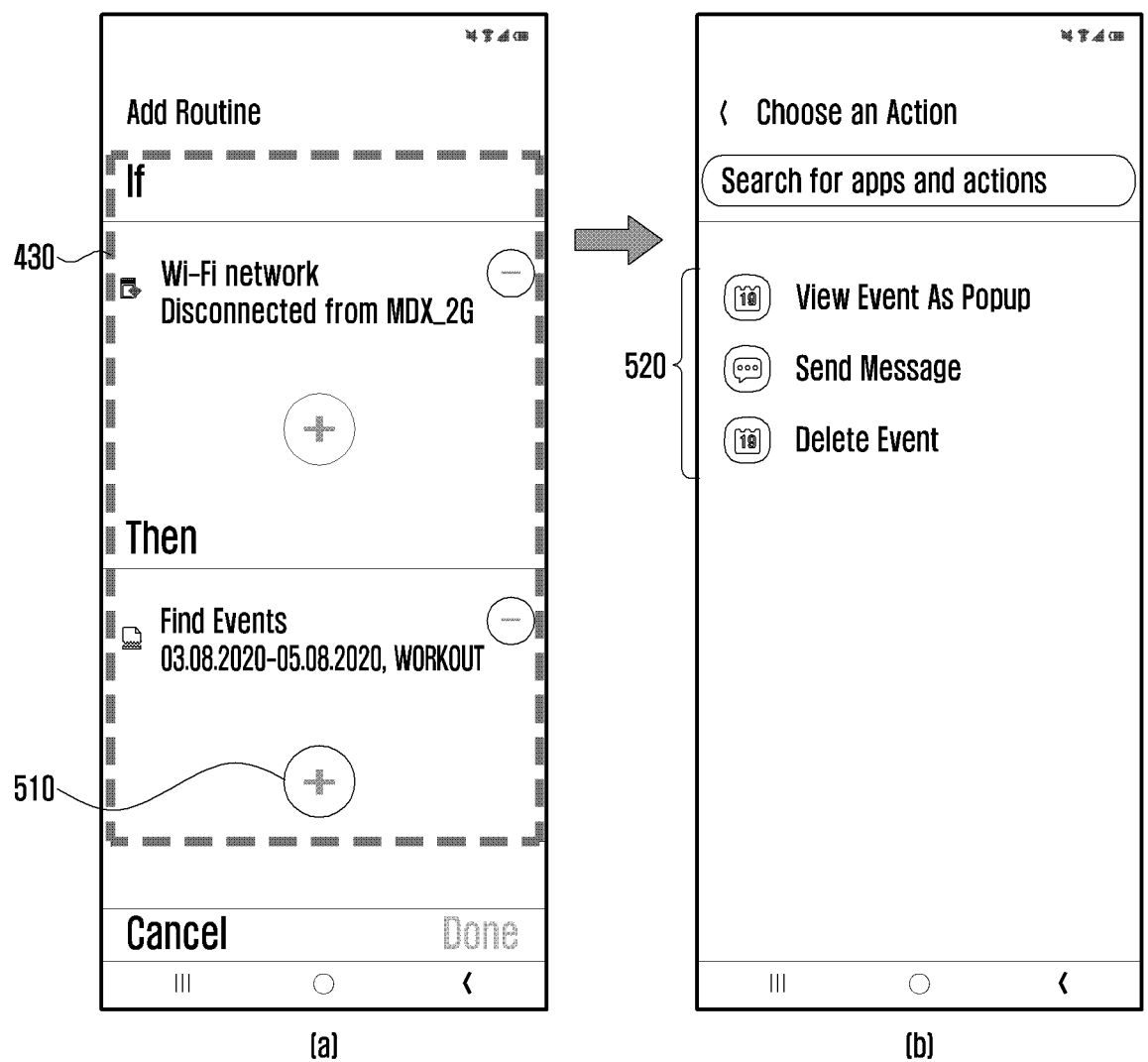
FIG. 5 illustrates an operation of providing the user with a candidate list of a follow-up action according to an embodiment.

FIG. 5 illustrates an operation of providing the user with a candidate list of a follow-up action according to an embodiment. In describing FIG. 5, the description duplicated with the description in FIG. 4 will be omitted or will be simply made. In FIG. 5A, the user can set additional actions in the second section by selecting button 510. In response to selecting button 510, the screen of FIG. 5B displays a candidate list of second actions 520.

Referring to FIG. 5A, a processor (e.g., the processor 299 of FIG. 2) may provide the user with the registration screen 430 including a button 510 for adding a second action to be performed after a first action, through a display.

Referring to FIG. 5B, the processor 299 may provide a candidate list 520 through the display in response to a user input on an add button 510. In an embodiment, the processor 299 may identify an output value type of the first action in response to a user input. For example, referring to FIG. 3, the processor 299 may identify a value of "type field" among sub fields of the output value 360. The processor 299 may identify actions each having an input value type corresponding to the identified output value type, from the action DB 250, and determine the identified actions as a candidate of a follow-up action. For example, an output value type of a data reference action registered as a preceding action may be a value indicating a schedule (or event). The processor 299 may select actions (e.g., view an input value (event) in a pop-up window, send an input value (schedule) through a message, and delete an input value (event)), each of which uses the schedule-related value as an input value, as candidates for the follow-up action. The processor 299 may provide action items corresponding to candidates, respectively, through the candidate list 520. The processor 299 may register an action selected from the candidate list 520 as the second action of an automation to be performed after the first action.

Figure 6:
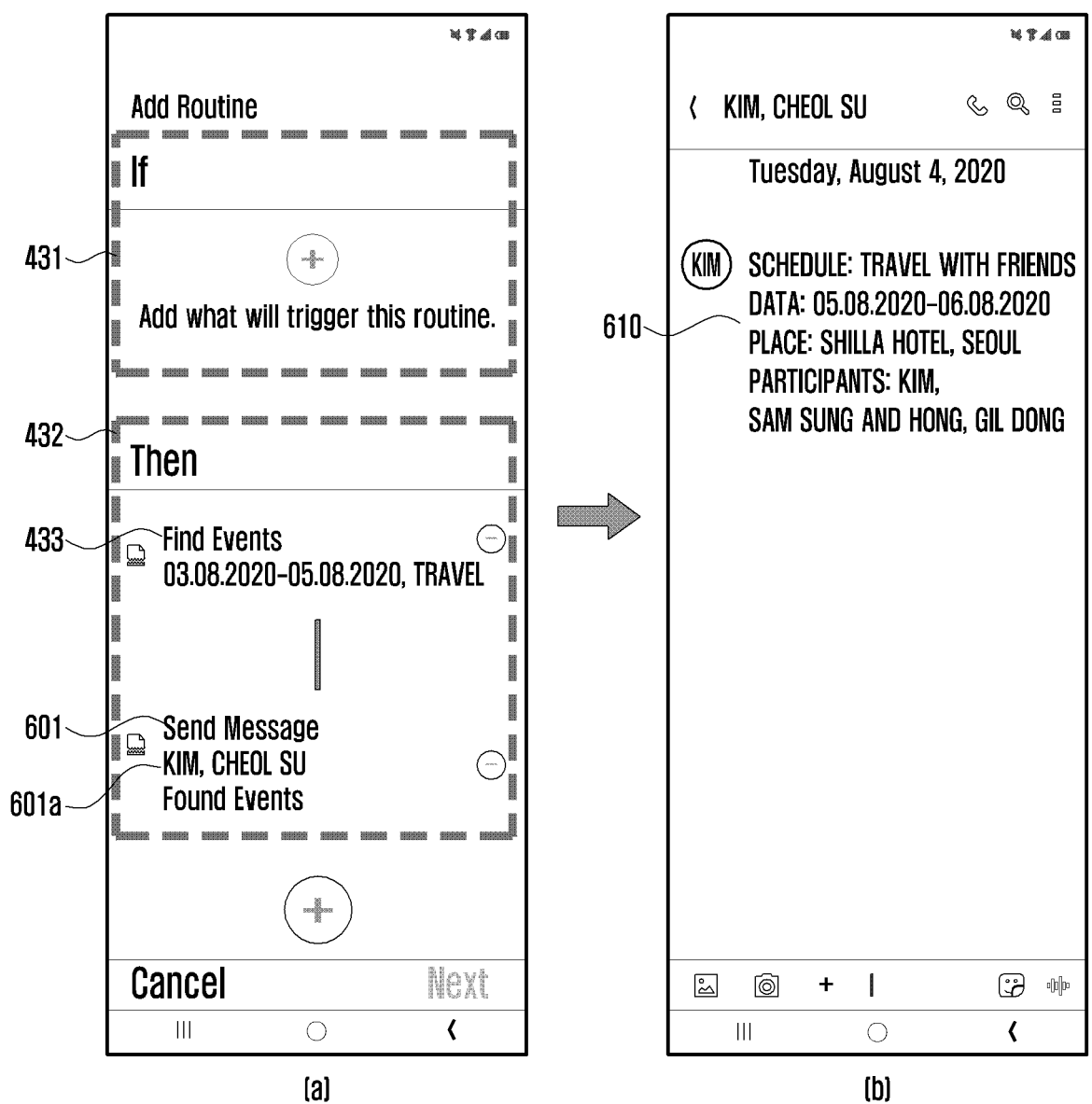
FIG. 6 illustrates an operation of providing a result of an automation according to an embodiment.

FIG. 6 illustrates an operation of providing a result of an automation according to an embodiment. In describing FIG. 6, the description duplicated with the description in FIGS. 4 and 5. will be omitted or will be simply made. In FIG. 6A, there are presented actions 433 and 601 that occur in response to the condition or trigger in the first section 431. The output value of the first action 433 is different from the input value to the second action item 601. Accordingly, the processor 299 may convert the output value type of the first action according to the input value type of the second action, thereby forming a chainable relationship.

Referring to FIG. 6A, a processor (e.g., the processor 299 of FIG. 2) may provide the first action item 433 indicating a first action and a second action item 601 indicating a second action using an output value (e.g., schedule) of the first action as a first input value, through the second section 432. The processor 299 may receive a second input value required to perform the second action from the user through the second section 432. For example, the processor 299 may display an execution screen (e.g., a contact screen) of an application configured to execute the second action (e.g., send OO (first input value) to OO (second input value) through a message), on the display in response to a touch input of the user on the second action item 601. The processor 299 may configure designated information (e.g., contact information) as the second input value of the second action by communicating with the user through the execution screen. Additionally, the processor 299 may display the second input value (e.g., a name of a recipient of a message) in the position adjacent to the second action item 601.

The processor 299 may convert the output value type of the first action according to the input value type of the second action. For example, the processor 299 may establish a chainable relationship between the first action of "retrieve schedule OO" and the second action of "send schedule OO to OO through a message" while generating an automation. The output value type (e.g., schedule) of the first action may be different from the input value type (e.g., text) of the second action and a chainable relationship may not be established therebetween. Accordingly, the processor 299 may convert the output value type of the first action from the schedule to the text.

Referring to FIG. 6B, the processor 299 may provide the user with the result 610 of performance of the second action through an execution screen of the corresponding application. For example, when the processor 299 recognizes that a trigger registered in the first section 431 has occurred from the registration screen of FIG. 6A, the processor 299 may automatically perform the first action and the second action registered in the second section 432, and provide the user with the result 610 of the performance through the display.

Figure 7:
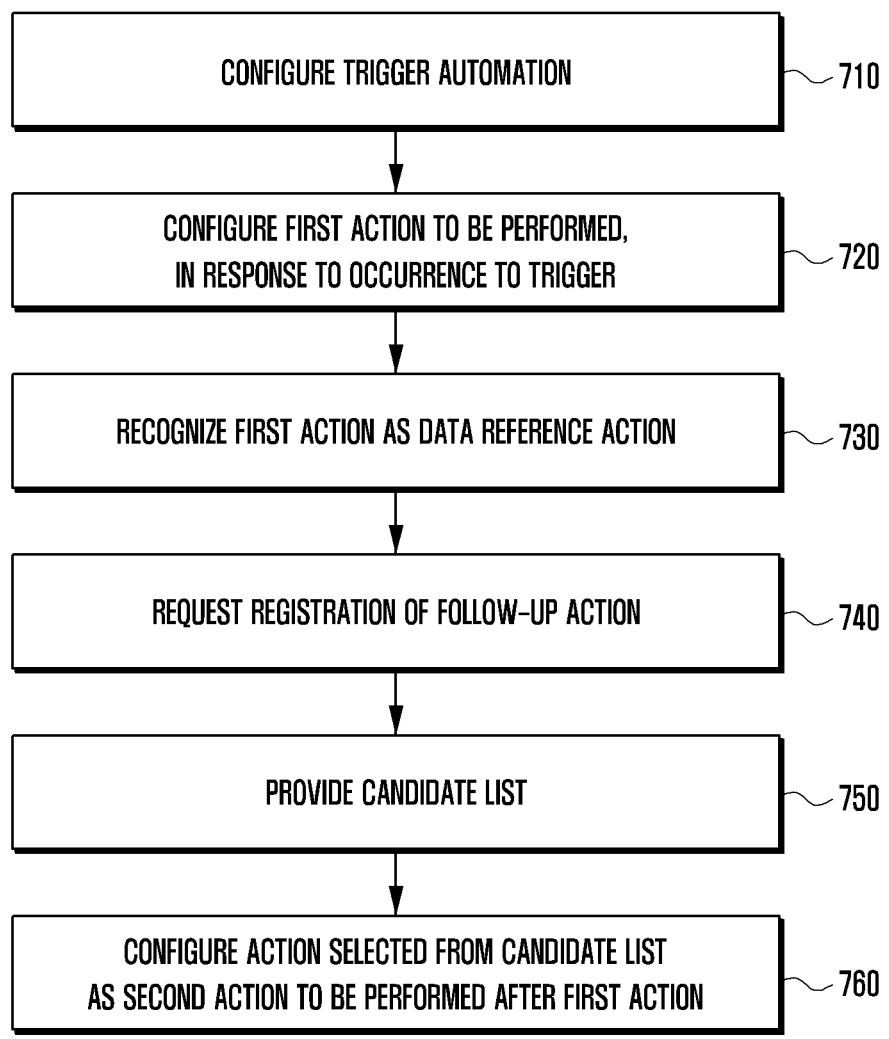
FIG. 7 is a flow chart illustrating operations for automation registration according to an embodiment.

FIG. 7 is a flow chart illustrating operations for automation registration according to an embodiment.

In operation 710, a processor (e.g., the processor 299 of FIG. 2) may configure a trigger of an automation by communicating with a user through a display. For example, the processor 299 may execute an automation service module 220 according to a user input. In an embodiment, the processor 299 may provide an icon indicating the automation service module 220 through a home screen. The processor 299 may execute the automation service module 220 in response to a touch input of the user on the icon. In an embodiment, the user input may be a voice input designated to invoke the automation service module 220. For example, the processor 299 may include a speech recognition module. The processor 299 may receive a voice input of the user through a microphone (e.g., the input module 150 of FIG. 1) and convert the voice input into text data. The processor 299 may execute the automation service module 220 in response to the text data including text (e.g., "Execute an automation") designated to invoke the automation service module 220. The processor 299 may provide an execution screen (e.g., a trigger registration screen (or a trigger configuration screen)) of the automation service module 220 through a display. The processor 299 may identify a specification of a trigger corresponding to a keyword input through the trigger registration screen, from a trigger DB 240. The processor 299 may configure a trigger list with the identified specification of the trigger and provide the trigger list through the trigger registration screen. The processor 299 may configure an automation feature selected by a user from the trigger list, as a trigger of an automation to be registered in the automation DB 260.

In operation 720, the processor 299 may configure a first action to be performed in response to occurrence of a trigger. For example, the processor 299 may provide the action list through the display. The processor 299 may provide an execution screen (e.g., an action registration screen (or an action configuration screen)) of the automation service module 220 through the display. The processor 299 may identify a specification of an action corresponding to a keyword input through the action registration screen, from an action DB 250. The processor 299 may configure an action list with the identified specification of the action and provide the action list through the action registration screen. The processor 299 may configure an automation feature selected by a user from the action list, as a first action of an automation to be registered in the automation DB 260.

In operation 730, the processor 299 may recognize that the first action corresponds to a data reference action by using information indicating an output value type of the first action. For example, the processor 299 may classify the first action as the data reference action if a data reference action value (a value of "dataReferenceAction") is true from the output value of the first action, and may classify the first action as a data processing action if the data reference value is false.

In operation 740, the processor 299 may request registration of a follow-up action from a user as the first action is classified as the data reference action. For example, the processor 299 may provide the user with guidance on a need for registration of the follow-up action, through a pop-up window.

In operation 750, the processor 299 may configure a candidate list with candidates which can be registered as the follow-up actions, according to a user response to the request, and provide the same through the display. For example, the processor 299 may identify, from the action DB 250, actions each having an input value type that is identical to the output value of the first action, and may configure the candidate list by using specifications of the identified actions.

In operation 760, the processor 299 may configure an action selected by the user from the candidate list as a second action to be performed after the first action.

In certain embodiments, after performing operation 760, a determination can be made whether the action selected in operation 760 is another data reference action. Where the action selected in operation 760 is another data reference action, steps 740-760 can be repeated until the action selected is not a data reference action.

Figure 8:
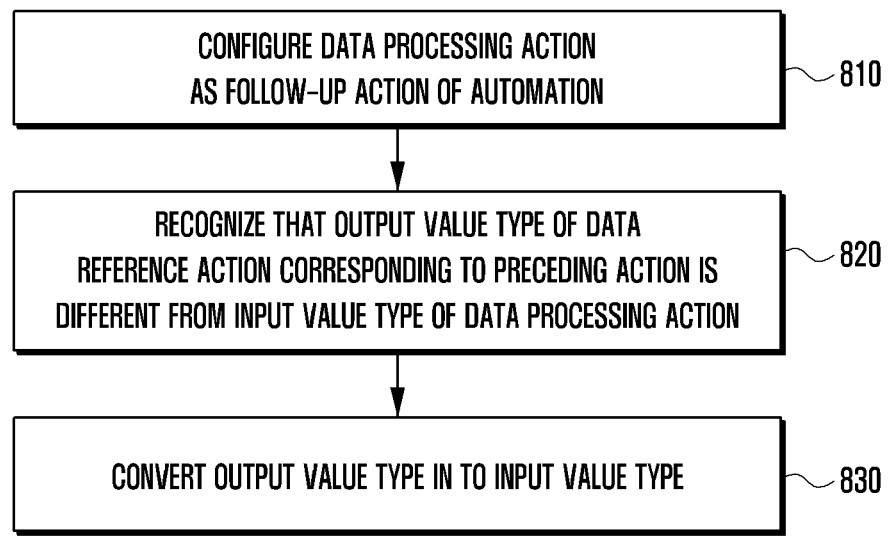
FIG. 8 is a flow chart illustrating operations for converting an output value type of a data reference action according to an embodiment.

FIG. 8 is a flow chart illustrating operations for converting an output value type of a data reference action according to an embodiment.

In operation 810, a processor (e.g., the processor 299 of FIG. 2) may configure a data processing action as a follow-up action of an automation. For example, the processor 299 may configure a data processing action selected from a candidate list (e.g., the candidate list 520 of FIG. 5) as the follow-up action of the automation.

In operation 820, the processor 299 may recognize that an output value type of a data reference action configured as a preceding action of an automation is different from an input value type of a data processing action.

In operation 830, the processor 299 may convert the output value type into the input value type. For example, the processor 299 may automatically perform the preceding action according to occurrence of a trigger. As a result of the preceding action, properties a, b, and c of type A (e.g., CalendarEvent) may be output. The processor 299 may convert the type of each of properties a, b, and c, which corresponds to an output value of the preceding action, into property d of type B (e.g., string), which corresponds to an input value of a subsequent action. The processor 299 may use property d as an input value required to perform the subsequent action.

Figure 9:
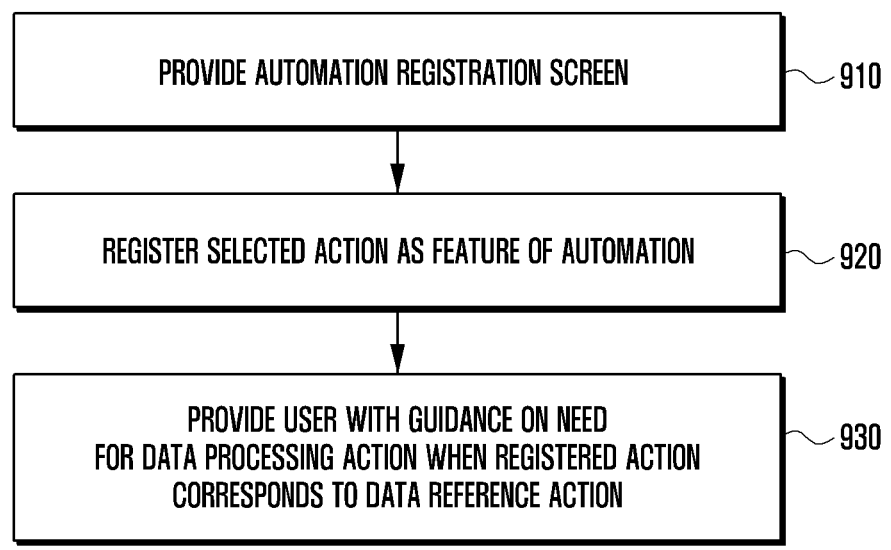
FIG. 9 is a flow chart illustrating operations for automation registration according to an embodiment.

FIG. 9 is a flow chart illustrating operations for automation registration according to an embodiment.

In operation 910, the processor 299 may provide a user with a registration screen enabling a user to register an automation in the electronic device 200, through the display 210.

In operation 920, the processor 299 may register an action (e.g., an action corresponding to an item selected from the action list 410 of FIG. 4A) selected by the user through the registration screen, in the electronic device as an automation feature. For example, the processor 299 may store the selected action in the automation DB 260 as the corresponding automation feature.

In operation 930, when a registered action corresponds to a data reference action configured to refer to data, the processor 299 may provide the user with guidance on a need for a data processing action as a follow-up action of the registered action, through the display.

An electronic device (e.g., the electronic device 200 of FIG. 2) according to certain embodiments may include: a touch-sensitive display; a processor operatively connected to the display; and a memory operatively connected to the processor, wherein the memory stores instructions which, when executed, cause the processor to provide, through the display, a registration screen for registering an automation in the electronic device, the automation being defined as at least one action automatically executed when a designated trigger occurs; register an action in the electronic device as a feature of the automation through the registration screen, the action being selected by a user; and when the action registered as the feature of the automation corresponds to a data reference action configured to refer to data, display guidance information for a data processing action, the data processing action being configured to output a result value by using, as a first input value, an output value output as a result of executing the data reference action.

The instructions may cause the processor to provide, in response to a user input with respect to the guidance information, a list of candidates (e.g., the candidate list 520 of FIG. 5) selectable as the data processing action, through the display.

The instructions may cause the processor to identify a type of the output value from a specification of the data reference action, identify actions having an input value type corresponding to the output value type from a database in which specifications of actions are stored, and configure the candidate list by using the specifications of the identified actions.

The instructions may cause the processor to identify a sub field value indicating the output value type, among sub fields of the output value.

The instructions may cause the processor to display the guidance information on a need for the data processing action through a pop-up window (e.g., the pop-up window 440 of FIG. 4).

The instructions may cause the processor to convert the output value type according to an input value type when the output value type is different from the input value type of the action registered in the electronic device as the data processing action.

The instructions may cause the processor to display a completion button (e.g., the completion button 450 of FIG. 4) for completion of automation registration, among multiple user interface (UI) features provided through the registration screen, to cause the completion button to be displayed distinguishably from remaining UI features when there is no data processing action registered in the electronic device as a follow-up action to be performed after the data reference action. The instructions may cause the processor to blurredly display the completion button compared to the remaining UI features. The instructions may cause the processor to maintain a display of the registration screen without responding to a user input when the user input on the completion button is received from the display in a state in which there is no data processing action registered in the electronic device as a follow-up action to be performed after the data reference action.

The instructions may cause the processor to configure a second input value received through the registration screen, as an input value required to perform the data processing action.

The instructions may cause the processor to recognize the action registered as the feature of the automation, as the data reference action by using a value indicating whether the action corresponds to the data reference action, among sub fields of an output value of the action registered as the feature of the automation.

A method for operating an electronic device according to certain embodiments may include: providing, through a display, a registration screen for registering an automation in the electronic device, the automation being defined as at least one action automatically executed when a designated trigger occurs; registering an action in the electronic device as a feature of the automation through the registration screen, the action being selected by a user; and when the action registered as the feature of the automation corresponds to a data reference action configured to refer to data, displaying guidance information for a data processing action, the data processing action being configured to output a result value by using, as a first input value, an output value output as a result of executing the data reference action.

The method may further include displaying, in response to a user input with respect to the guidance information, a candidate list which indicates candidates selectable as the data processing action, through the display.

The displaying of the candidate list may include: identifying a type of the output value from a specification of the data reference action; identifying actions having an input value type corresponding to the output value type from a database in which specifications of actions are stored; and configuring the candidate list by using the specifications of the identified actions.

The identifying of the type of the output value may include identifying a sub field value indicating the type of the output value, among sub fields of the output value.

The method may further include converting the output value type according to an input value type when the output value type is different from the input value type of the action registered in the electronic device as the data processing action.

The method may further include displaying a completion button for completion of automation registration, among multiple user interface (UI) features provided through the registration screen, to cause the completion button to be displayed distinguishably from remaining UI features when there is no data processing action registered in the electronic device as a follow-up action to be performed after the data reference action.

The displaying of the completion button to cause the completion button to be displayed distinguishably from the remaining UI features may include blurredly displaying the completion button compared to the remaining UI features.

The method may further include maintaining a display of the registration screen without responding to a user input when the user input on the completion button is received from the display in a state in which there is no data processing action registered in the electronic device as a follow-up action to be performed after the data reference action.

The method may further include recognizing the action registered as the feature of the automation, as the data reference action by using a value indicating whether the action corresponds to the data reference action, among sub fields of an output value of the action registered as the feature of the automation.

The embodiments disclosed in this specification and the drawings are merely specific examples presented in order to easily describe technical details according to embodiments of the disclosure and to help the understanding of the embodiments of the disclosure, and are not intended to limit the scope of embodiments of the disclosure. Therefore, all changes or modifications derived from the technical idea of certain embodiments of the disclosure as well as certain embodiments disclosed herein should be construed to fall within the scope of certain embodiments of the disclosure.

The invention claimed is:

1. An electronic device comprising:
a touch-sensitive display;
a processor operatively connected to the display; and
a memory operatively connected to the processor,
wherein the memory stores instructions which, when executed, cause the processor to:
providing, through the display, a registration screen for registering an automation in the electronic device, the automation being defined as at least one action automatically executed when a designated trigger occurs;
register an action in the electronic device as a feature of the automation through the registration screen, the action being selected by a user;
based on the action registered as the feature of the automation corresponding to a data reference action configured to refer to data, display guidance information for a data processing action, the data processing action being configured to output a result value by using, as a first input value, an output value output as a result of executing the data reference action; and
provide, in response to a user input with respect to the guidance information, a list of candidates selectable as the data processing action, through the display,
wherein the instructions, when executed, further cause the processor to:
identify a type of the output value from a specification of the data reference action;
identify actions having an input value type corresponding to the output value type from a database in which specifications of actions are stored;
configure the candidate list by using the specifications of the identified actions; and
register an action selected by a user from the candidate list as the data processing action of the automation to be performed after the data reference action is performed.

2. The electronic device of claim 1, wherein the instructions cause the processor to identify a sub field value indicating the output value type, among sub fields of the output value.

3. The electronic device of claim 1, wherein the instructions cause the processor to display the guidance information on a need for the data processing action through a pop-up window.

4. The electronic device of claim 1, wherein the instructions cause the processor to convert the output value type according to an input value type when the output value type is different from the input value type of the action registered in the electronic device as the data processing action.

5. The electronic device of claim 1, wherein the instructions cause the processor to display a completion button for completion of automation registration, among multiple user interface (UI) features provided through the registration screen, to cause the completion button to be displayed distinguishably from remaining UI features when there is no data processing action registered in the electronic device as a follow-up action to be performed after the data reference action.

6. The electronic device of claim 5, wherein the instructions cause the processor to blurredly display the completion button compared to the remaining UI features.

7. The electronic device of claim 5, wherein the instructions cause the processor to maintain a display of the registration screen without responding to a user input when the user input on the completion button is received from the display in a state in which there is no data processing action registered in the electronic device as a follow-up action to be performed after the data reference action.

8. The electronic device of claim 1, wherein the instructions cause the processor to configure a second input value received through the registration screen, as an input value required to perform the data processing action.

9. The electronic device of claim 1, wherein the instructions cause the processor to recognize the action registered as the feature of the automation, as the data reference action by using a value indicating whether the action corresponds to the data reference action, among sub fields of an output value of the action registered as the feature of the automation.

10. A method for operating an electronic device, the method comprising:
providing, through a display, a registration screen for registering an automation in the electronic device, the automation being defined as at least one action automatically executed when a designated trigger occurs;
registering an action in the electronic device as a feature of the automation through the registration screen, the action being selected by a user;
based on the action registered as the feature of the automation corresponding to a data reference action configured to refer to data, displaying guidance information for a data processing action, the data processing action being configured to output a result value by using, as a first input value, an output value output as a result of executing the data reference action; and
displaying, in response to a user input with respect to the guidance information, a candidate list which indicates candidates selectable as the data processing action, through the display; and
registering an action selected by a user from the candidate list as the data processing action of the automation to be performed after the data reference action is performed,
wherein displaying the candidate list comprises:
identifying a type of the output value from a specification of the data reference action;
identifying actions having an input value type corresponding to the output value type from a database in which specifications of actions are stored; and
configuring the candidate list by using the specifications of the identified actions.

11. The method of claim 10, wherein the identifying of the type of the output value comprises identifying a sub field value indicating the type of the output value, among sub fields of the output value.

* * * * *